(12) United States Patent
Wei et al.

(10) Patent No.: US 7,973,501 B2
(45) Date of Patent: Jul. 5, 2011

(54) FAN SYSTEM AND MOTOR CONTROL DEVICE

(75) Inventors: Chia-Pin Wei, Taoyuan Hsien (TW); Wei-Shuo Tseng, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 543 days.

(21) Appl. No.: 12/188,320

(22) Filed: Aug. 8, 2008

(65) Prior Publication Data

US 2009/0047006 A1 Feb. 19, 2009

(30) Foreign Application Priority Data

Aug. 15, 2007 (TW) .............................. 96130161 A

(51) Int. Cl.
*H02P 6/16* (2006.01)

(52) U.S. Cl. .................... 318/400.04; 318/600; 388/829

(58) Field of Classification Search .................. 318/600, 318/800, 430, 400.04; 388/829; 323/272
See application file for complete search history.

(56) References Cited

U.S. PATENT DOCUMENTS 6,054,823 A * 4/2000 Collings et al. .......... 318/400.04

* cited by examiner

*Primary Examiner* — Karen Masih
(74) *Attorney, Agent, or Firm* — Muncy, Geissler, Olds & Lowe, PLLC

(57) ABSTRACT

A fan system includes a control device and a fan device. The control device has a first node, a rotation speed signal generation circuit and a rotation speed reading circuit. The fan device has a second node, a signal transforming circuit, a motor driving circuit, a motor and a fan. The first node is electrically connected with the second node to set up a transmission route between the control device and the fan device. The rotation speed control signal and the motor rotation speed signal are transmitted via the two-way transmission route, and the control device controls the fan device via a wired or wireless transmission route. A motor control device is also disclosed.

20 Claims, 7 Drawing Sheets

FAN SYSTEM AND MOTOR CONTROL DEVICE

BACKGROUND OF THE INVENTION

This Application claims priority of Taiwan Patent Application No. 96130161, filed on Aug. 15, 2007, the entirety of which is incorporated by reference herein.

1. Field of the Invention

The present invention relates generally to a fan system and a motor control device and more particularly to a fan system and a motor control device with two-way operation in a same transmission route by integrating a motor rotation speed signal and a rotation speed control signal of the fan system.

2. Description of the Related Art

A fan used as a heat-dissipating device is a common structure setting. For the usage of clients, increase or decrease of fan number usually depends on various requirements of clients. Additionally, in a fan, the rotation speed of a motor is driven and controlled by a controller or a control chip, thereby adjusting the rotation speed of the fan in the correspondence of the actual operation condition of clients.

Referring to FIG. 1, a conventional fan system is constituted by a fan device 14 and a control device 15 (controlled by clients), wherein the fan device 14 is electrically connected to the control device 15. The fan device 14 is constituted by a motor driving circuit 21, a motor 22, and a fan 23. The control device 15 generally is constituted by a pulse width modulation generation circuit 11 and a rotation speed reading circuit 12. The pulse width modulation generation circuit 11 and the rotation speed reading circuit 12 are electrically connected to the motor driving circuit 21 of the fan device 14 respectively for setting up a first transmission route 10 and a second transmission route 20. In addition the pulse width modulation generation circuit 11 generates a pulse width modulation (PWM) signal to the motor driving circuit 21 via the first transmission route 10 for control of the motor 22 and the fan 23 of the fan device 14 based on the PWM signal. Morevoer, the rotation speed signal of the fan device 14 returns to the rotation speed reading circuit 12 via the second transmission route 20 such that the control device 15 may obtain the actual rotation speed value of the motor 22 and the fan 23 of the fan device 14. Said motor driving circuit 21 is electrically connected to the pulse width modulation generation circuit 11 and the rotation speed reading circuit 12 respectively for receiving the pulse width modulation signal and transmitting the rotation speed signal of the motor 22. Therefore, the above-mentioned signals are operated independently.

BRIEF SUMMARY OF THE INVENTION

The present invention provides a fan system and a motor control device capable of integrating the transmission of the motor rotation speed signal and the rotation speed control signal thereof, thereby reducing complexity of the circuit and saving cost.

Therefore, a fan system according to the present invention includes a control device and a fan device. The control device includes a first node, a rotation speed signal generation circuit, and a rotation speed reading circuit, wherein the rotation speed generation circuit is electrically connected to the first node for providing a rotation speed control signal; and the rotation speed reading circuit is electrically connected to the first node for receiving a motor rotation speed signal as well as obtaining the actual rotation speed value of the motor. The fan device further includes a motor, a fan, a second node, a signal transforming circuit, and a motor driving circuit, wherein the motor is electrically connected to the fan for driving rotation of the fan; the second node is electrically connected to the first node for setting up a transmission route with the first route; the signal transforming circuit is electrically connected to the second node for receiving the rotation speed control signal via the transmission route so as to transform the rotation speed control signal into a speed control voltage as an output; and the motor driving circuit is electrically connected to the second node, the signal transforming circuit, and the motor respectively for receiving the speed control voltage, controlling the rotation speed of the motor based on the speed control voltage, and generating the motor rotation speed signal as an output via the transmission route.

Moreover, the present invention discloses a motor control device connected to a motor, comprising: a first node, a second node, a rotation speed signal generation circuit, a signal transforming circuit, and a motor driving circuit, wherein the second node is electrically connected to the first node for setting up a transmission route with the first node; the rotation speed signal generation circuit is electrically connected to the first node for providing a rotation speed control signal to modulate the rotation speed of the motor and output via the transmission route; the signal transforming circuit electrically connected to the second node transforms the rotation speed control signal received in the transmission route into a speed control voltage as an output; the motor driving circuit is electrically connected to the second node, the signal transforming circuit, and the motor respectively for receiving the speed control voltage signal, controlling the rotation speed of the motor based on the speed control voltage, generating and outputting the motor rotation speed signal via the transmission route; and the rotation speed reading circuit is electrically connected to the first node for receiving the motor rotation speed signal from the transmission route so as to obtain the actual rotation speed value of the motor.

The first node and the second node are connected by wiring or connected by wirelessing. And the transmission route is wired or wireless, or the first node and the second node are the same node.

The rotation speed signal generating circuit and the rotation speed control signal are a pulse width modulation generation circuit and a pulse width modulation signal respectively. The signal transforming circuit is a digital-to-analog circuit for transforming the rotation speed control signal into the speed control voltage with a direct current (DC) level via digital/analog conversion.

The fan system or the motor control device further includes a first switch, a second switch and an adjusting circuit, wherein the first switch, electrically connected to the first node and the rotation speed reading circuit respectively, is turned on upon receiving the motor rotation speed signal and outputs the motor rotation speed signal to the rotation speed reading circuit; the second switch, electrically connected to the rotation speed signal pin of the motor driving circuit and the second node respectively, is turned on upon receiving the motor rotation speed signal and outputs the motor rotation speed signal; the adjusting circuit is electrically connected to the second node for adjusting a peak-to-peak value of the rotation speed control signal as well as the rotation speed of the motor, wherein the peak-to-peak value is between 0V and 3V.

The motor driving circuit is a microprocessor, a digital signal processor, or a control chip.

BRIEF DESCRIPTION OF THE DRAWINGS

A fan system and a motor control device according to a preferred embodiment of the present invention can be more

DETAILED DESCRIPTION OF THE INVENTION

A detailed description of a fan system and a motor control device according to a preferred embodiment of the present invention is given in the following with reference to the accompanying drawings.

Figure 1:
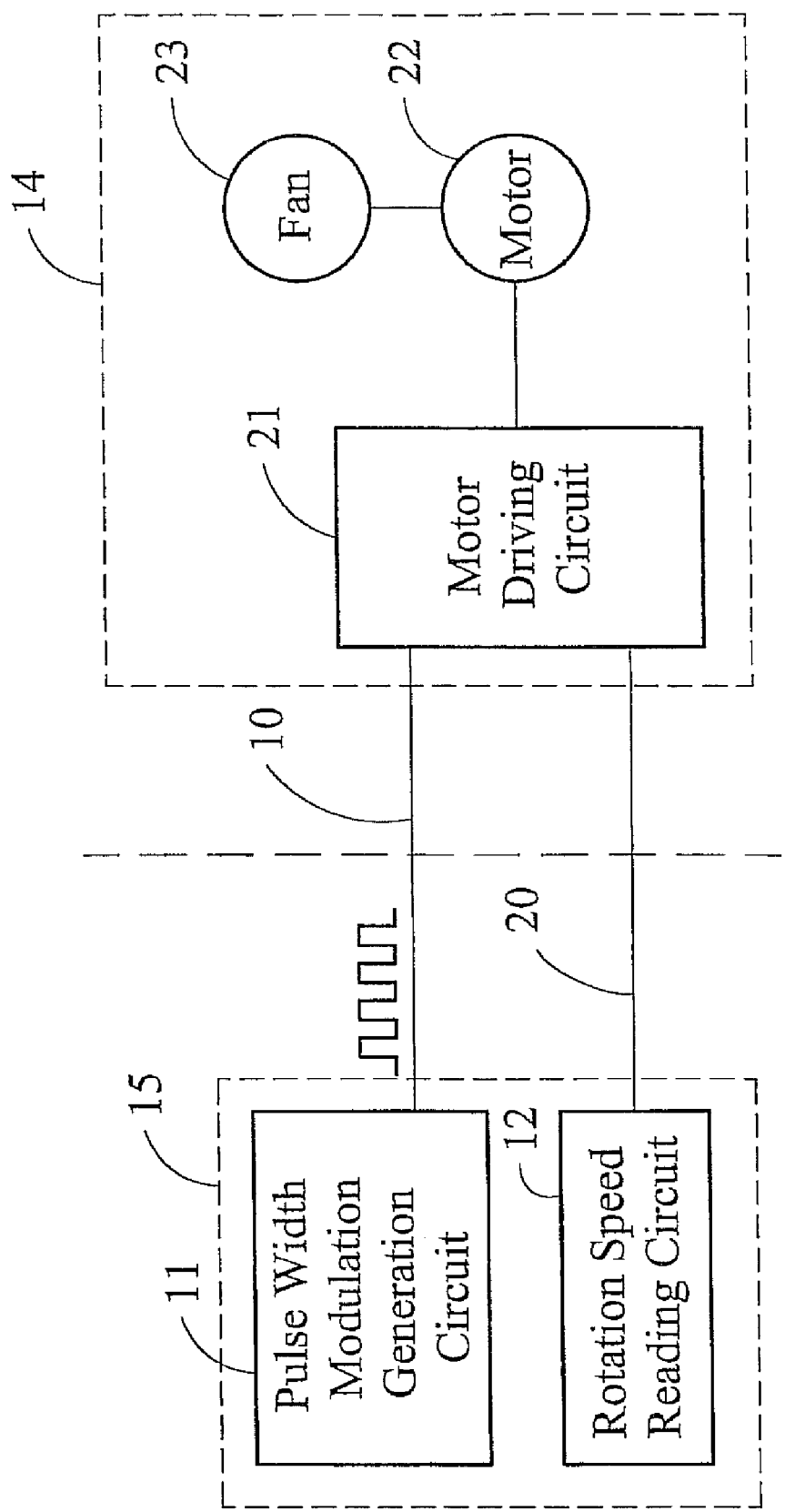
FIG. 1 is a schematic illustration of a conventional fan system.
Figure 2A:
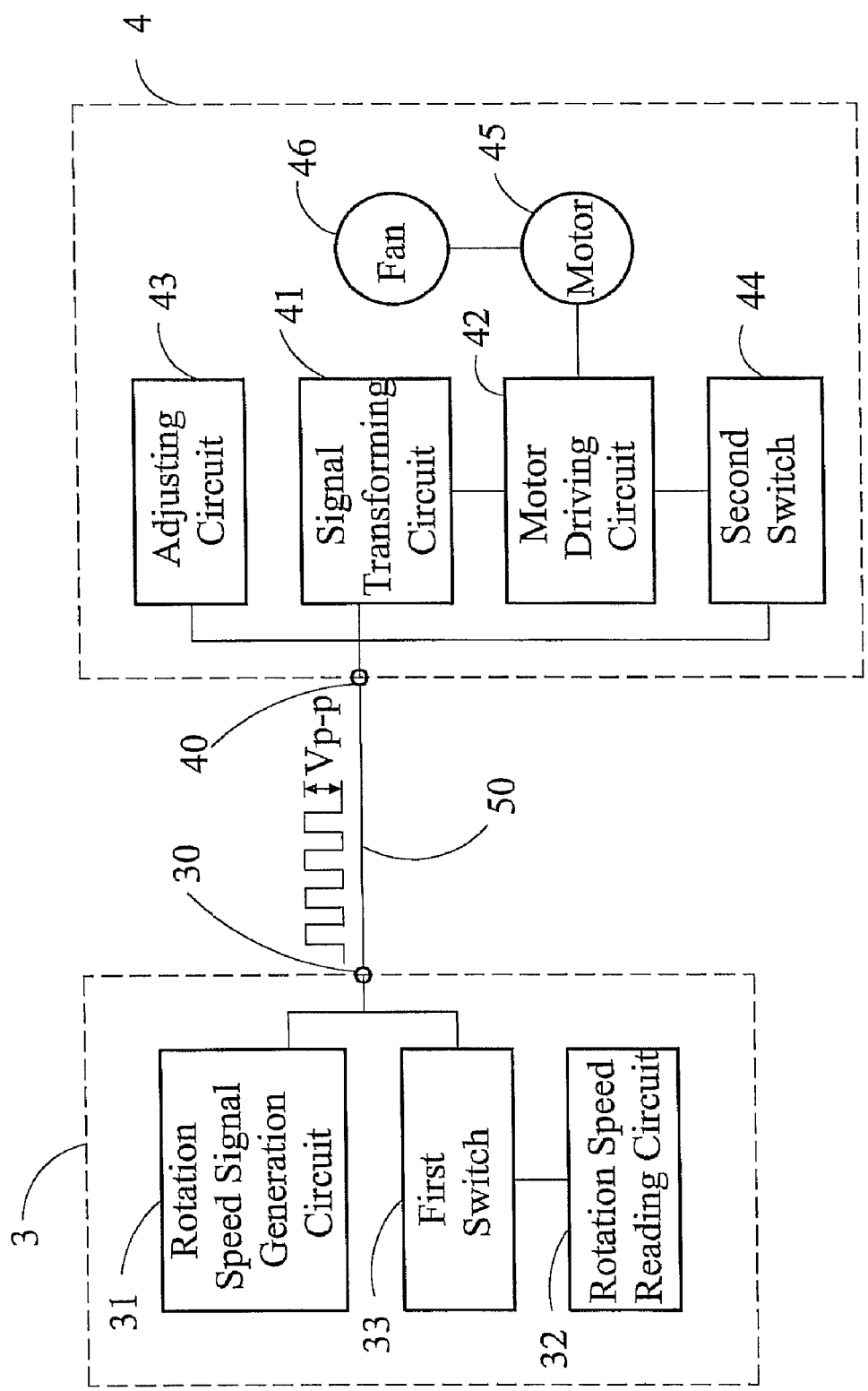
FIG. 2A is a block diagram of a fan system according to a preferred embodiment of the present invention.
Figure 2B:
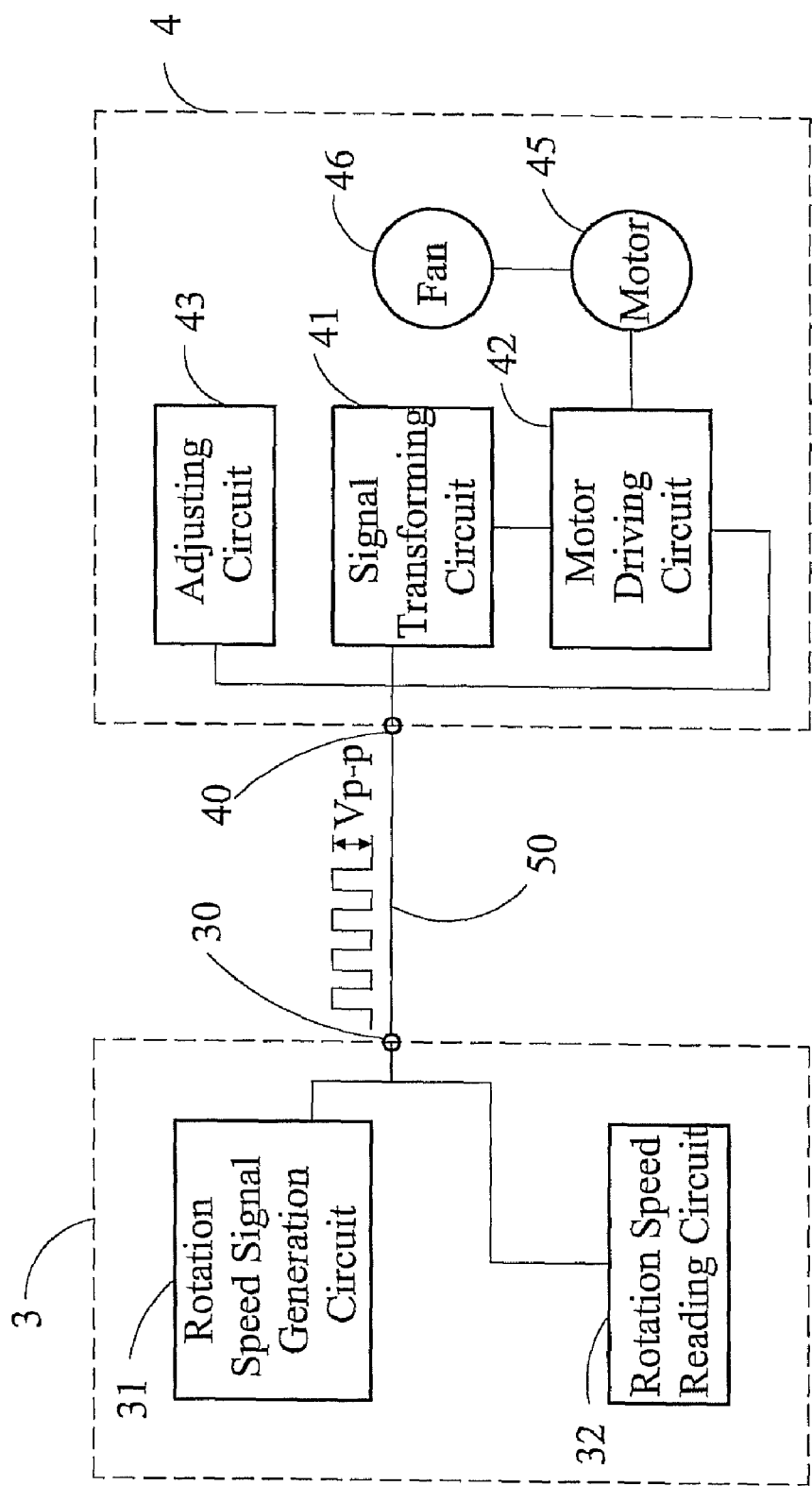
FIG. 2B is a block diagram of a fan system according to another preferred embodiment of the present invention.

Referring to FIGS. 2A and 2B, a fan system according to preferred embodiments of the present invention includes a control device 3 and a fan device 4, wherein the control device 3 and the fan device 4 are connected to each other via a first node 30 and a second node 40 for setting up a transmission route 50. Therefore, the control device 3 controls the operation of the fan device 4 via the transmission route 50. The first node 30 and the second node 40 are electrically connected by wiring or connected by wirelessing. Additionally, the transmission route 50 is wired or wireless. Further, in another embodiment, the first node 30 and the second node 40 are the same node.

According to the embodiments of FIGS. 2A and 2B, the control device 3 includes a first node 30, a rotation speed signal generation circuit 31, a rotation speed reading circuit 32, and a first switch 33.

Figure 4:
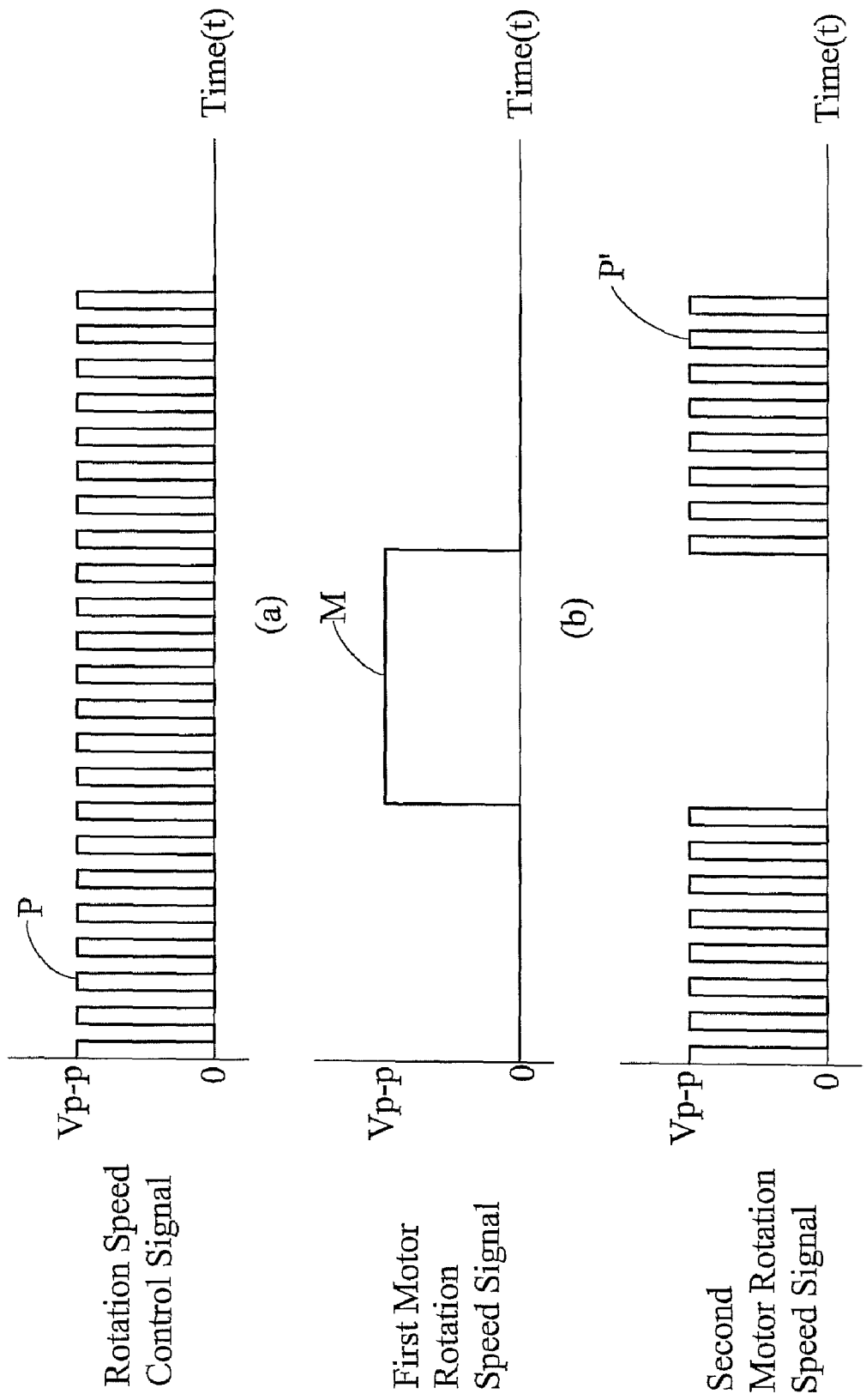
FIG. 4 is waveform diagrams of a rotation speed control signal and a motor rotation speed signal according to the present invention.

The rotation speed signal generation circuit 31 is electrically connected to the first node 30 for providing a rotation speed control signal P (as shown in FIG. 4($a$)) as an output via the first node 30. In the embodiments, the rotation speed signal generation circuit 31 is a pulse width modulation (PWM) generation circuit and the rotation speed control signal P is a pulse width modulation signal.

The motor rotation speed signal includes a first motor rotation speed signal M and a second motor rotation speed signal P'. The rotation speed reading circuit 32 is electrically connected to the first node 30 via the first switch 33 as shown in FIG. 2A. The first switch 33 is turned on upon receiving the first motor rotation speed signal M or the second motor rotation speed signal P' (as shown in FIG. 4($c$)) via the transmission route 50. As a result, the rotation speed reading circuit 32 obtains the actual rotation speed value from the motor 45 and the fan 46 of the fan device 4. In addition, as shown in FIG. 2B, the rotation speed reading circuit 32 can also directly receive the first motor rotation speed signal M or the second motor rotation speed signal P' without using the first switch 33.

Figure 3:
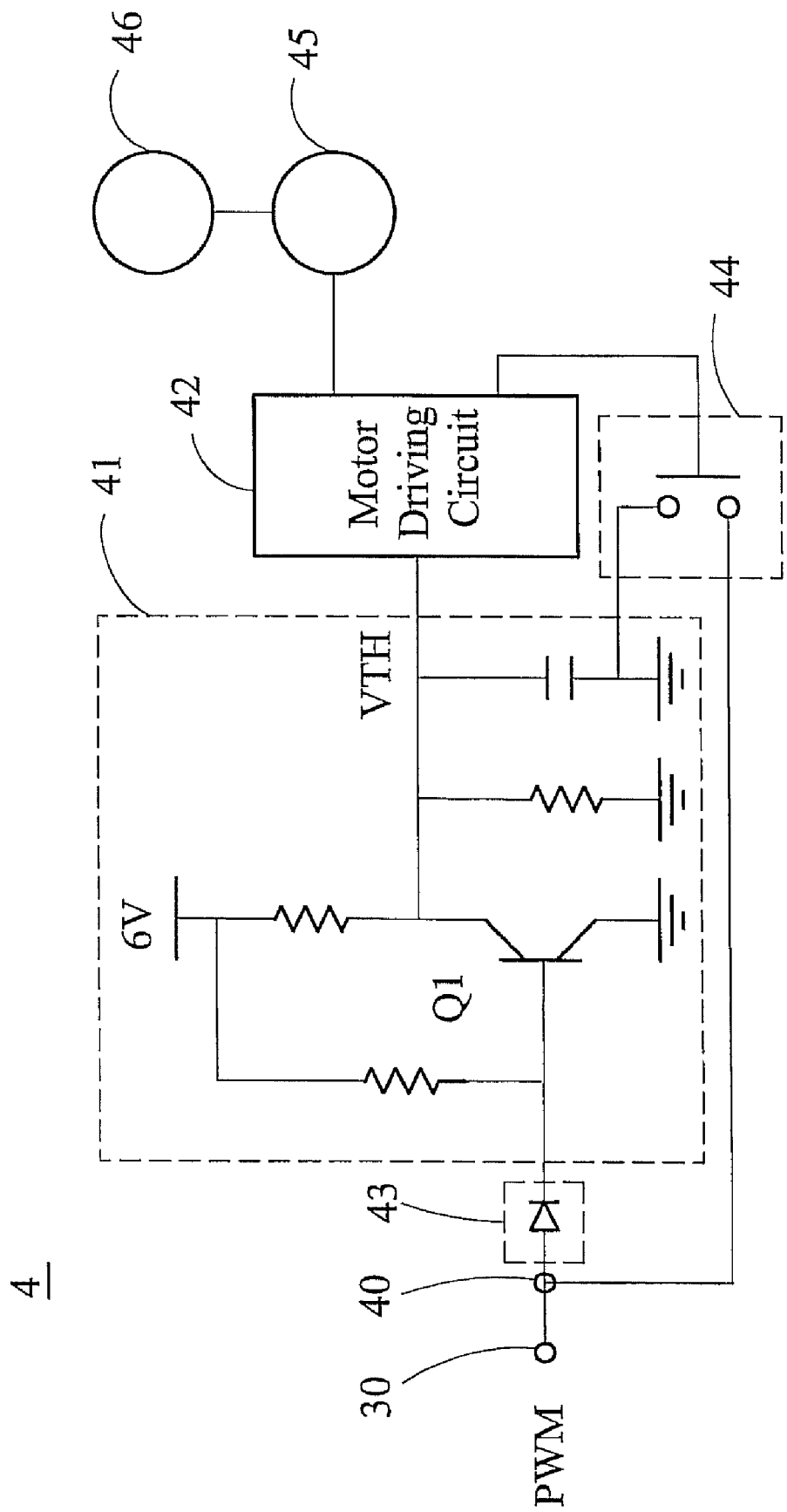
FIG. 3 is a circuit diagram of a fan device according to another preferred embodiment of the present invention.

Accompanying with FIG. 3, the fan device 4 according to the embodiment of FIG. 2A includes the second node 40, a signal transforming circuit 41, a motor driving circuit 42, an adjusting circuit 43, a second switch 44, the motor 45, and the fan 46.

The signal transforming circuit 41 electrically connected to the second node 40 and the motor driving circuit 42 respectively, receives the rotation speed control signal P via the transmission route 50. Then, the rotation speed control signal P is transformed into a speed control voltage (VTH) as an output to the motor driving circuit 42. In this embodiment, the signal transforming circuit 41 is a digital-to-analog (D/A) circuit, wherein the rotation speed control signal P is transformed into the speed control voltage (VTH) with an analog direct current level via digital/analog conversion.

The motor driving circuit 42 is electrically connected to the signal transforming circuit 41 and the motor 45. Also, the motor driving circuit 42 is electrically connected to the second node 40 via the second switch 44. The motor driving circuit 42 receives the speed control voltage (VTH) from the signal transforming circuit 41, determines the value of the speed control voltage (VTH), and then transmits the corresponding driving signal to the motor 45. Therefore, the motor 45 and the fan 46 electrically connected thereto are driven to operate correspondingly (such as stopping or rotating). Further, the rotation speed of the motor 45 and the fan 46 is controlled in accordance with the speed control voltage.

Moreover, the motor rotation speed signal include the first motor rotation speed signal M and the second motor rotation speed signal P'. When the motor driving circuit 42 drives the motor 45 and the fan 46 to start rotating, a first motor rotation speed signal M is simultaneously generated in the correspondence with the actual rotation speed of the motor 45 and then transmitted to the second switch 44. In this embodiment, the second switch 44 can be an N-type metal oxide semiconductor (NMOS) transistor. The second switch 44 is turned on upon receiving the first motor rotation speed signal M. For example, the gate of the NMOS transistor receives the first motor rotation speed signal M. Then, the second motor rotation speed signal P', as shown in FIG. 4($c$), is generated at the second node 40. The first motor rotation speed signal M returns to the control device 3 via the transmission route 50. In addition, the rotation speed control signal P and the second motor rotation speed signal P' can be transmitted via the same transmission route 50. Consequently, there are the rotation speed control signal P from the control device 3 to the fan device 4 and the second motor rotation speed signal P' from the fan device 4 to the control device 3 in the transmission route 50. The rotation speed reading circuit 32 in the control device 3 can receive the second motor rotation speed signal P'. For another example, when the motor driving circuit 42 drives the motor 45 and the fan 46 to start operating, the first motor rotation speed signal M is simultaneously generated in the correspondence with the actual speed of the motor 45 and then transmitted to the control device 3 via the transmission route 50 without using the second switch 44 shown in FIG. 2A. In this embodiment, the motor driving circuit 42 is a control chip. Also, in other embodiments, the motor driving circuit 42 is either a microprocessor or a digital signal processor.

Figure 6:
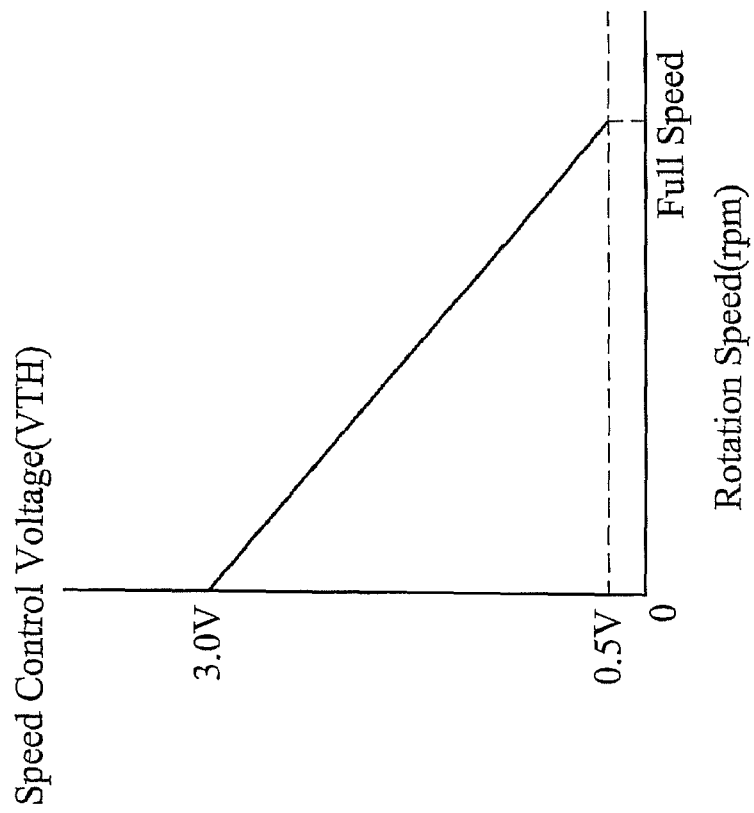
FIG. 6 is a relation diagram of speed control voltage and rotation speed of a fan system.
Figure 5:
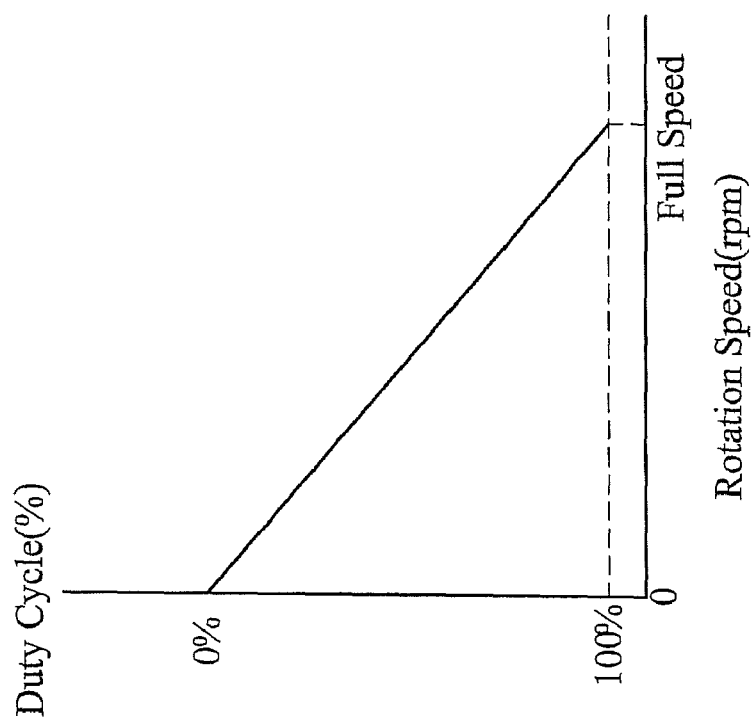
FIG. 5 is a relation diagram of duty cycle and rotation speed of the fan system.

Please refer to FIG. 5 and FIG. 6. FIG. 5 and FIG. 6 are relation diagrams illustrating the relation of the duty cycle of the rotation speed control signal P, the speed control voltage, and rotation speed of the motor driving circuit 42. Additionally, with reference to FIG. 5, the duty cycle of the rotation speed control signal P is in a positive relation with the rotation speed of the motor driving circuit 42. Accordingly, the smaller the duty cycle is, the lower rotation speed of the motor 45 operates. Also, the greater the duty cycle is the higher rotation speed of the motor 45 operates. Further, when the duty cycle is 100%, the motor 45 rotates at full speed. When the duty cycle is 0%, the rotation speed of the motor 45 is 0 and the motor 45 then stops rotating.

In other embodiments, 0%~10% or 91%~100% of the duty cycle is set to stop the motor 45 rotation, and 11%~90% of the duty cycle is set to rotate the motor 45, but not limited to.

Please refer to FIG. 6, which illustrates the range of the speed control voltage VTH is between 0V and 3V. Further, the speed control voltage VTH is in a negative relation with rotation speed of the motor 45 driven by the motor driving circuit 42. That is, the greater the voltage is, the lower the rotation speed of the motor 45 operates. And, the smaller the voltage is, the higher the rotation speed of the motor 45 operates. Assuming that the motor 45 rotates at full speed when the voltage value is between 0V and 0.5V. Once the voltage value equals to 3V, the rotation speed of the motor 45 is 0 and then the motor 45 stops rotating.

In other embodiments, 0V is set by the motor driving circuit 42 to stop the rotation of the motor 45, and 2.5V~3V is set to drive the motor 45 rotating at full speed, but not limited to.

Figure 7:
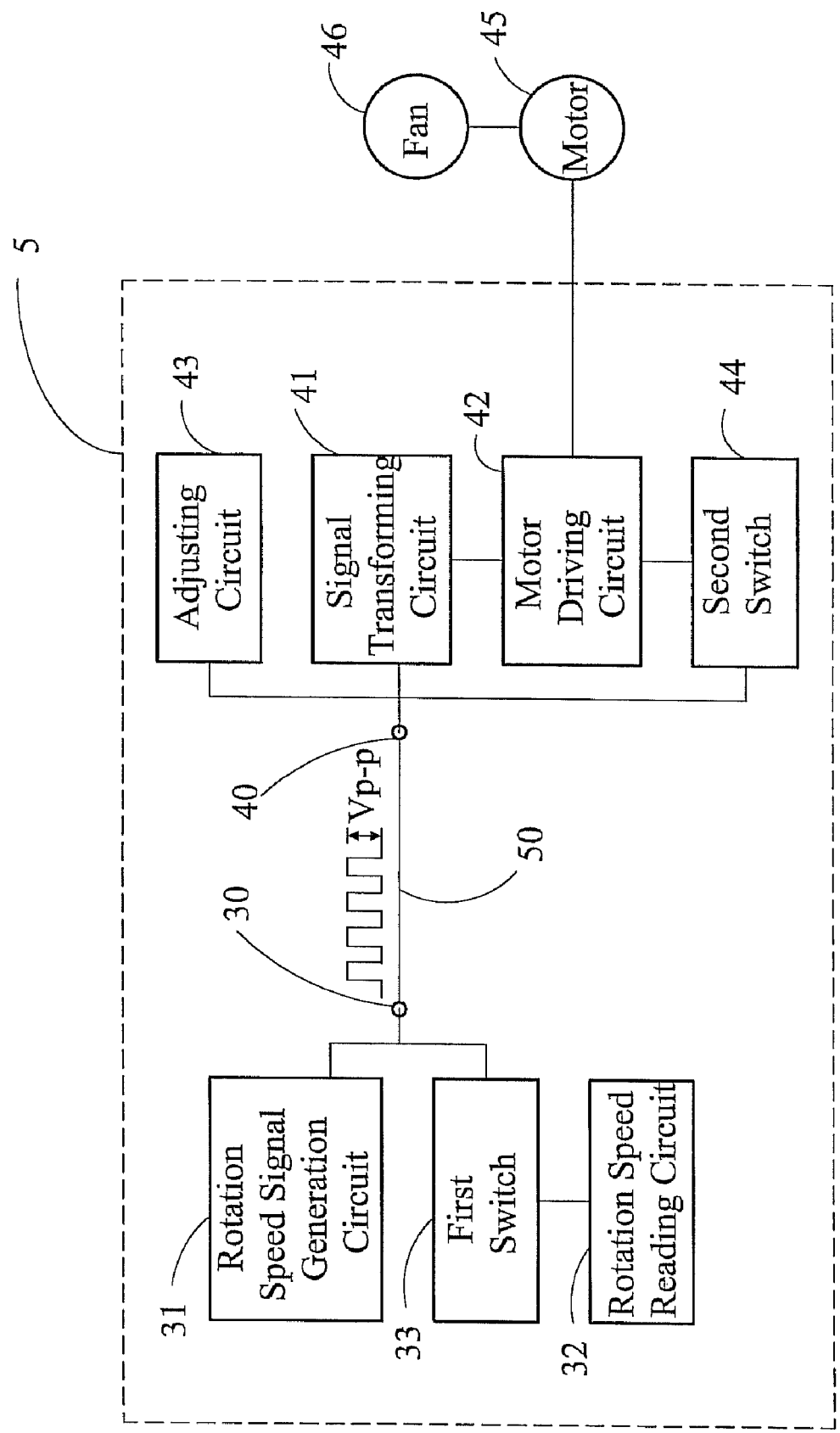
FIG. 7 is a block diagram of a motor control device connected to a motor and a fan according to another embodiment of the present invention.

Please refer to FIG. 7, which illustrates a block diagram of a motor control device connecting to a motor and a fan according to another embodiment of the present invention. The motor control device 5 integrates a first node 30, a rotation speed signal generation circuit 31, a rotation speed reading circuit 32, a second node 40, a signal transforming circuit 41, and a motor driving circuit 42. The motor control device 5 is electrically connected to a motor 45 for driving the rotation of the motor 45 and a fan 46 electrically connected thereto. Moreover, the first node 30 is electrically connected to the rotation speed signal generation circuit 31 and the rotation speed reading circuit 32 respectively. In addition, the signal transforming circuit 41 is electrically connected to the second node 40 and the motor driving circuit 42. The motor driving circuit 42 is further electrically connected to the motor 45. The second node 40 is electrically connected to the first node 30 to form a transmission route 50 with the first node 30.

The rotation speed signal generation circuit 31 of the motor control device 5 generates a rotation speed control signal P which is transmitted to the signal transforming circuit 41 via the transmission route 50. The signal transforming circuit 41 transforms the rotation speed control signal P into a rotation speed voltage (VTH) for output to the motor driving circuit 42. The motor driving circuit 42 generates a corresponding driving signal to the motor 45 in accordance with the rotation speed control voltage (VTH) for driving the motor 45 and the fan 46 electrically connected thereto operating correspondingly (such as stopping or rotating), so as to control the rotation speed of the motor 45 and the fan 46. Meanwhile, the motor driving circuit 42 generates a first motor rotation speed signal M or a second motor rotation speed signal P' corresponding to the actual speed of the motor 45. The first motor rotation speed signal M or the second motor rotation speed signal P' is transmitted to the rotation speed reading circuit 32 via the transmission route 50 such that the rotation speed reading circuit 32 obtains the actual speed value of the motor 45 and the fan 46.

Moreover, said motor control device 5 further includes a first switch 33, a second switch 44, and an adjusting circuit 43, wherein the connection and function of the first switch 33, the second switch 44 and the adjusting circuit 43 are substantially the same with the first switch 33, the second switch 44, and the adjusting circuit 43 in the first embodiment of the present invention, and therefore, detailed descriptions thereof are omitted for simplicity.

Consequently, both the fan system and the motor control device 5 according to the present invention integrate the first motor rotation speed signal M or the second motor rotation speed signal P', and the rotation speed control signal P to be transmitted in the same transmission route 50 for saving space and cost of the control device (clients) and reducing the complexity of the circuit so as to achieve the object of intelligence and multi-function for products.

While the present invention has been described by way of example and in terms of preferred embodiments, it is to be understood that the present invention is not limited to the disclosed embodiments. To the contrary, it is intended to cover various modifications and similar arrangements (as would be apparent o those skilled in the art). Therefore, the scope of the appended claims should be accorded the broadest interpretation so as to encompass all such modifications and similar arrangements.

What is claimed is:

1. A fan system, comprising:
a control device comprising a first node; a rotation speed signal generation circuit electrically connected to the first node for generating a rotation speed control signal; and a rotation speed reading circuit electrically connected to the first node for receiving a motor rotation speed signal as well as obtaining an actual rotation speed value of a motor; and
a fan device, comprising a second node electrically connected to the first node and forming a transmission route with the first node; a signal transforming circuit electrically connected to the second node for transforming the rotation speed control signal received form the transmission route into a speed control voltage as an output; and a motor driving circuit electrically connected to the second node and the signal transforming circuit for receiving the speed control voltage so as to generating the motor rotation speed signal based on the speed control voltage and transmitting the motor rotation speed signal via the transmission route.

2. The fan system as claimed in claim 1, wherein the first node and the second node are connected by wiring or connected by wirelessing.

3. The fan system as claimed in claim 2, wherein the transmission route is wired or wireless.

4. The fan system as claimed in claim 1, wherein the first node and the second node are the same node.

5. The fan system as claimed in claim 1, wherein the rotation speed signal generation circuit is a pulse width modulation generation circuit and the rotation speed control signal is a pulse width modulation signal.

6. The fan system as claimed in claim 1, wherein the signal transforming circuit is a digital-to-analog circuit for transforming the rotation speed control signal into the speed control voltage with a direct current level via digital/analog conversion.

7. The fan system as claimed in claim 1, wherein the control device further comprises a first switch, electrically connected to the first node and the rotation speed reading circuit respectively, for being turned on when receiving the motor rotation speed signal and thereby outputting the motor rotation speed signal to the rotation speed reading circuit.

8. The fan system as claimed in claim 1, wherein the motor driving circuit is a microprocessor, a digital signal processor, or a control chip.

9. The fan system as claimed in claim 1, wherein the motor rotation speed signal comprises a first motor rotation speed signal and a second motor rotation speed signal, and wherein the fan device further comprises a second switch, electrically connected to the motor driving circuit and the second node respectively, for being turned on when receiving the first motor rotation speed signal and thereby outputting the second motor rotation speed signal.

10. The fan system as claimed in claim 1, wherein the fan device further comprises an adjusting circuit electrically connected to the second node for adjusting a peak-to-peak value of the rotation speed control signal.

11. The fan system as claimed in claim 10, wherein the peak-to-peak value is between 0V and 3V.

12. A motor control device connected to a motor, the motor control device comprising:
- a first node;
- a second node electrically connected to the first node for forming a transmission route with the first node;
- a rotation speed signal generation circuit, electrically connected to the first node, for providing a rotation speed control signal so as to modulate the rotation speed of the motor as well as output the rotation speed control signal via the transmission route;
- a signal transforming circuit, electrically connected to the second node, for transforming the rotation speed control signal received from the transmission route into a speed control voltage as an output;
- a motor driving circuit, electrically connected to the second node, the signal transforming circuit, and the motor respectively, for receiving the speed control voltage so as to control the rotation speed of the motor based on the speed control voltage as well as generate the motor rotation speed signal as an output via the transmission route; and
- a rotation speed reading circuit, electrically connected to the first node, for receiving the motor rotation speed signal via the transmission route so as to obtain an actual speed value of the motor.

13. The motor control device as claimed in claim 12, wherein the first node and the second node are the same node.

14. The motor control device as claimed in claim 12, wherein the rotation speed signal generation circuit is a pulse width modulation generation circuit and the rotation speed control signal is a pulse width modulation signal.

15. The motor control device as claimed in claim 12, wherein the signal transforming circuit is a digital-to-analog circuit for transforming the rotation speed control signal into the speed control voltage via digital/analog conversion.

16. The motor control device as claimed in claim 12, further comprising a first switch, electrically connected to the first node and the rotation speed reading circuit respectively, for being turned on when receiving the motor rotation speed signal and thereby outputting the motor rotation speed signal to the rotation speed reading circuit.

17. The motor control device as claimed in claim 12, wherein the motor driving circuit is a microprocessor, a digital signal processor, or a control chip.

18. The motor control device as claimed in claim 12, wherein the motor rotation speed signals comprises a first motor rotation speed signal and a second motor rotation speed signal, and wherein in the motion control device further comprises a second switch, electrically connected to the motor driving circuit and the second node respectively, for being turned on when receiving the first motor rotation speed signal and thereby outputting the second motor rotation speed signal.

19. The motor control device as claimed in claim 12, further comprising an adjusting circuit electrically connected to the second node for adjusting a peak-to-peak value of the rotation speed control signal so as to adjust the rotation speed of the motor.

20. The motor control device as claimed in claim 19, wherein the peak-to-peak value is between 0V and 3V.

* * * * *